Sept. 5, 1967  A. B. HUBBARD ETAL  3,339,399
DIRECT READING DENSITOMETER
Filed Feb. 4, 1964  10 Sheets-Sheet 1

FIG. 1

INVENTORS
ALBERT B. HUBBARD
KENTON D. McMAHAN
BY

*Kane, Dalsimer & Kane*
ATTORNEYS

FIG. 3

Sept. 5, 1967  A. B. HUBBARD ETAL  3,339,399
DIRECT READING DENSITOMETER
Filed Feb. 4, 1964  10 Sheets-Sheet 7

INVENTORS
ALBERT B. HUBBARD
KENTON D. McMAHAN
BY
Kane, Dalsimer & Kane
ATTORNEYS

INVENTORS
ALBERT B. HUBBARD
KENTON D. McMAHAN
BY
ATTORNEYS

Sept. 5, 1967     A. B. HUBBARD ETAL     3,339,399
DIRECT READING DENSITOMETER Filed Feb. 4, 1964     10 Sheets-Sheet 10

INVENTORS
ALBERT B. HUBBARD
KENTON D. McMAHAN

BY Kane, Dalsimer & Kane
ATTORNEYS

United States Patent Office 3,339,399
Patented Sept. 5, 1967

3,339,399
DIRECT READING DENSITOMETER
Albert B. Hubbard, Woodstock, and Kenton D. McMahan, Scotia, N.Y., assignors to Rotron Manufacturing Company, Inc., Woodstock, N.Y., a corporation of New York
Filed Feb. 4, 1964, Ser. No. 342,494
27 Claims. (Cl. 73—30)

This invention relates generally to instruments for measuring the density of a flowing gas and which are commonly referred to as densitometers. More particularly, the invention relates to such a densitometer which gives the density measurement of the flowing gas directly without resort to auxiliary computing equipment or computations.

The densitometer disclosed herein is a device including a blower which is driven at a constant speed in the presence of flowing gas, the density of which is to be measured. Pressure differential developed across the blower is directly proportional to the density of the flowing gas. Hence, with proper calibration the density of the flowing gas can be read directly without dependence on other gas properties by reading the pressure differential across the blower. A high degree of accuracy is attained by the use of the device disclosed herein by incorporation in the device of many novel features.

It is a principal object of the present invention to provide a densitometer which is inherently more accurate than available calibration and readout equipment and techniques.

It is another object of the invention to provide a densitometer which gives highly accurate readings over a wide range.

It is another object of the invention to provide a densitometer which measures density directly at flowing conditions eliminating the need for separate calculations or corrections.

It is still another object of the invention to provide a densitometer which is designed to insure that the density of the sample read is the same as the density of the main gas stream.

It is a further object of the invention to provide a densitometer which can be used with corrosive gases and one having a range of measurement which can be easily changed in the field.

A densitometer constructed in accordance with the teachings of this invention and the manner of using the same is described herein with references to the drawings, in which.

Figure 1:
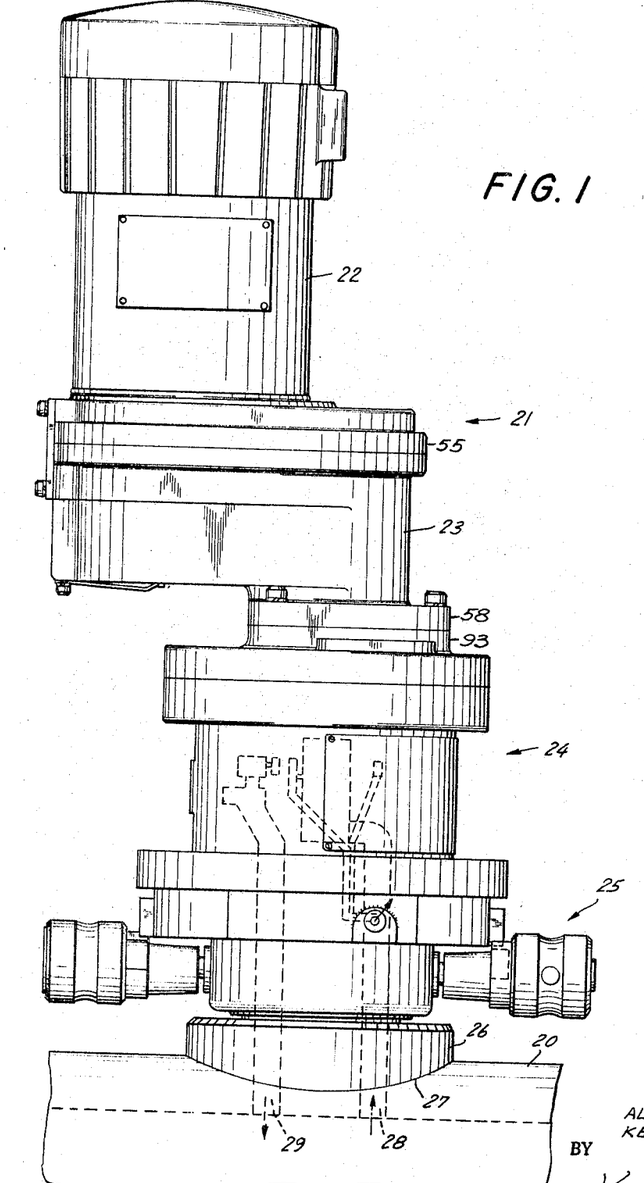
FIG. 1 is a side elevational view of a densitometer constructed in accordance with the teachings of this invention attached to a line through which gas is flowing, the density of which is to be measured by the instrument.

In FIG. 1 a densitometer constructed in accordance with the teachings of this invention is shown coupled to a pipe line 20 through which it is assumed gas is flowing. It is the density of the gas flowing in pipe line 20 which is to be measured by the densitometer. The densitometer is composed of three main units. The driver 21 is one of the main units consisting of motor 22 and pulley assembly 23. The second main unit is sensor 24 which is the heart of the densitometer and contains a centrifugal blower which is driven at a constant speed by the driver. Investment castings inside the sensor pressure case form the blower scroll, circulating passages, intake and discharge plenum chambers, and bring out the gauge line connections at service valve 25 which is the third major unit of the densitometer. Valve 25 is bolted to a mounting ring 26 and boss which are contoured to fit and welded at 27 to the pipe line 20.

The three unit construction gives many servicing advantages. The driver may be removed and replaced without breaking into any pressure circuit. The sensor may be removed, after closing the service valves, without blowing down the pipe line. Location of pressure taps on the valve plate allows the gauge line plumbing to remain undisturbed when the sensor is removed. It is noted that the densitometer circulates the gas sample from and back to the pipe line itself. This eliminates all accessories other than readout devices. In FIG. 1 the inlet passage is indicated by the numeral 28 and the discharge passage is indicated by the numeral 29.

*Driver*

Figure 2:
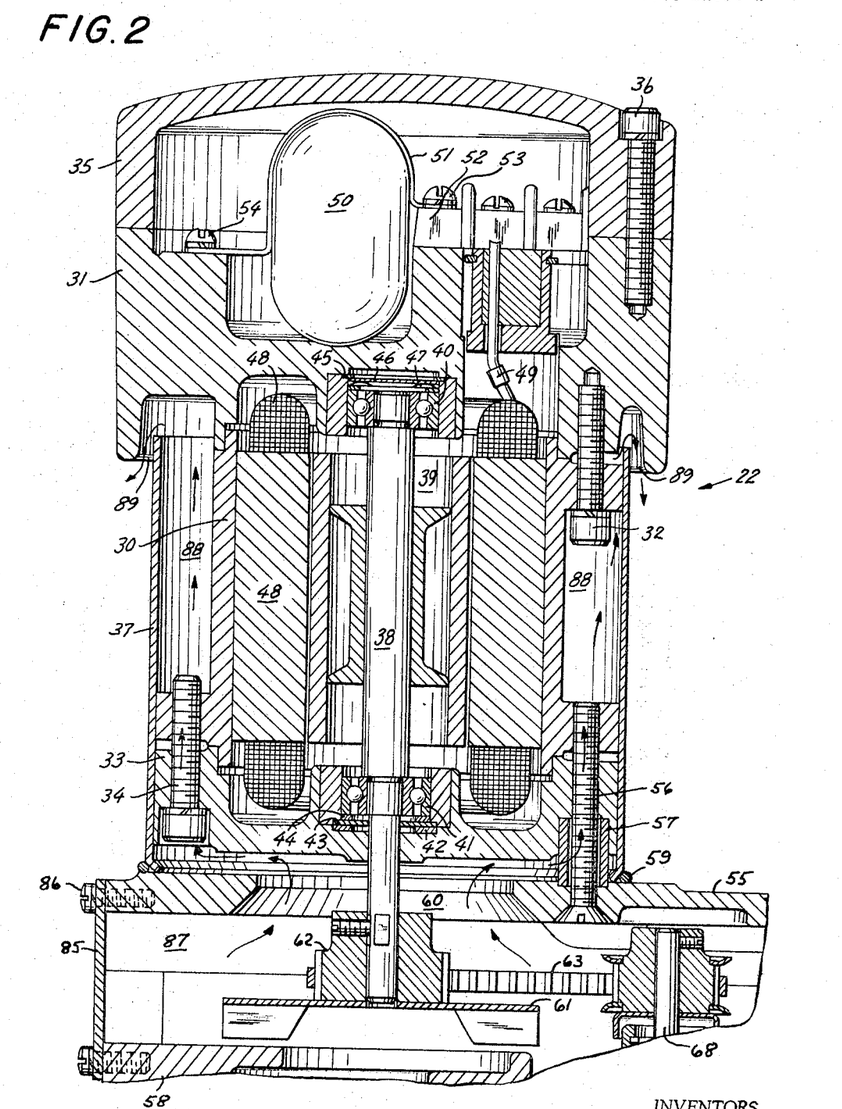
FIG. 2 is a vertical sectional view of the motor drive utilized in the densitometer shown in FIG. 1.
Figure 3:
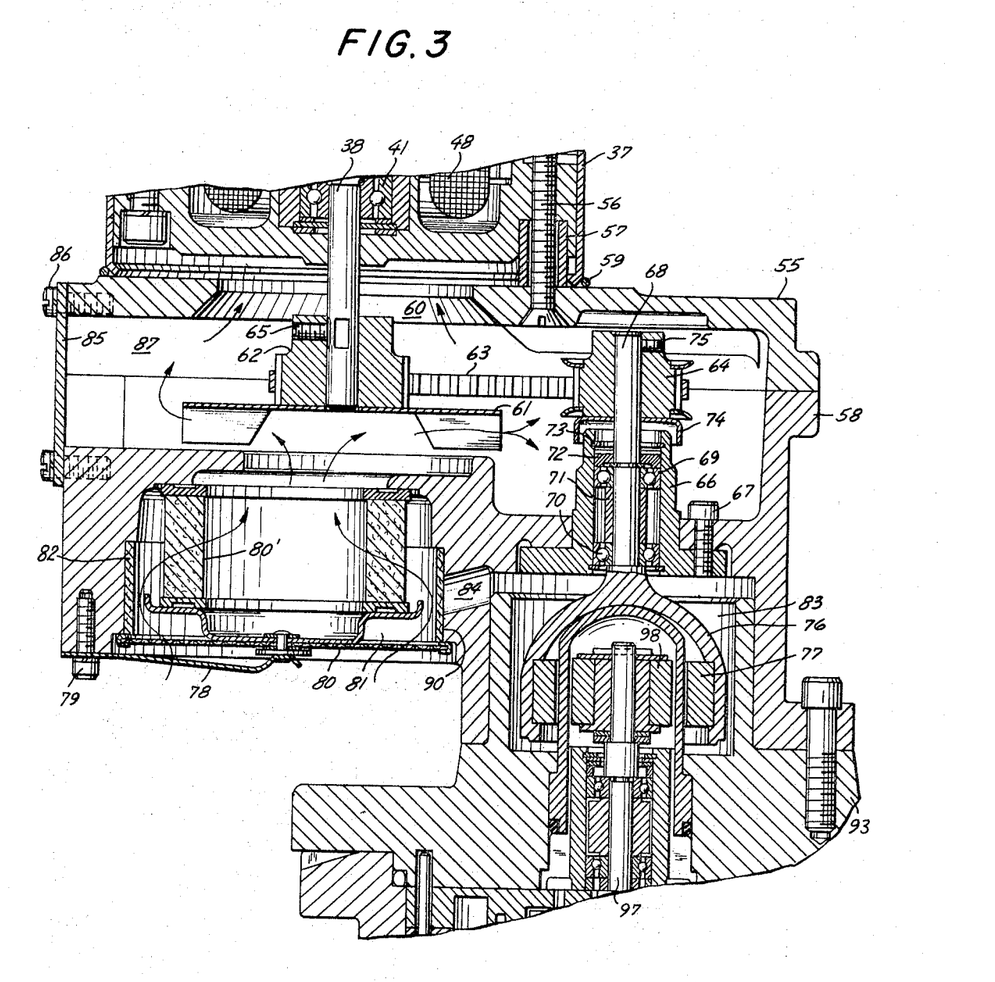
FIG. 3 is a vertical sectional view of the pulley assembly of the densitometer shown in FIG. 1.

The driver 21 consists of motor 22 which is shown in FIG. 2 and pulley assembly 23 which is shown in FIG. 3.

Housing 30 in FIG. 2 has attached thereto at one end front end bell 31 by means of screw 32, for example, and at its other end rear end bell 33 attached thereto, for example, by screw 34. A cover 35 is attached to the front end bell by means of screws, for example, screw 36, and a motor shroud 37 encloses the main body portion of the motor. The motor shaft 38 supporting rotor assembly 39 is mounted in the front and rear end bells by bearings 40 and 41, respectively. Bearing 41 is provided with retaining ring 42, dust plate 43 and shims 44 as is common in the art. Likewise, bearing 40 is provided with dust plate 45 and shims 46. In addition, spring washer 47 is provided as is common in the art. The stator assembly is indicated by the numeral 48.

In FIG. 2 portions of the electrical components of the motor are visible, such as lead 49 from the stator assembly and capacitor 50 which is held in position by clamp 51 beneath cover 35. A terminal strip 52 is shown with screws and screw 53 maintains clamp 51 in position on one side and screw 54 maintains the clamp in position on the other side.

The electrical features of the motor are not considered part of this invention and the motor is designed primarily to operate at 60 cycles 115 volts. It can be modified, however, for other voltages and frequencies. The motor is a synchronous motor which is explosion-proof for use in an explosive atmosphere designed pursuant to Underwriters' Laboratories, Inc. requirements as set forth in a bulletin dated Apr. 22, 1947, subject 674, entitled "Summary of Tests of Electric Motors, With Small Internal Free Volume, for Class I Group D Hazardous Locations."

The motor is coupled to the pulley housing cover 55, FIG. 3 by screws 56 and isolation spacers 57. There are four screws 56, only one of which is shown in FIG. 3, and each is surrounded by a spacer 57 which decreases the heat transfer due to conduction. The pulley housing cover is suitably attached to the pulley housing 58 and a sealing ring 59 is provided where the motor shroud 37 meets cover 55.

Motor shaft 38 projects through opening 60 in pulley cover 55 and fan blades 61 are attached thereto as well as a pulley 62 which is coupled through timing belt 63 to pulley 64. Pulley 62 is fastened to the motor shaft by means of a screw 65 and can transmit the motion of the motor shaft to pulley 64 through the timing belt 63. Rotation of motor shaft 38 also causes rotation of fan blades 61. A rabbeted cartridge 66 is supported in the pulley housing 58 and fastened thereto by screws indicated individually by the numeral 67. Cartridge 66 supports coupling 68 for rotary motion in ball bearings 69 and 70. The bearings are separated by a spacer 71 and bearing 69 is maintained in position by spring washer 72 and shims 73. A dust shield 74 is provided to keep bearing 69 clean.

Coupling shaft 68 is fastened to pulley 64 by means of screw 75 so that the coupling shaft 68 is driven in rotary motion by the motor shaft 38 through pulleys 62 and 64 which are coupled by belt 63.

A semi-spherical hollow driver housing 76 projects from one end of coupling shaft 68 and supports driver coupling magnet 77 on its inner surface. Driver coupling magnet 77 is cylindrical and permanently magnetized on its inner surface and provides one-half of a magnetic coupling to impeller driving shaft 97 of the sensor unit 24.

A resilient tensioning member 78 is fastened at one end to pulley housing 58 by screw 79 and yieldingly urges filter screen 80 within filter cavity 81 and further urges filter member 80' within the cavity. A circular blowout liner 82 is cemented in place within a portion of filter cavity 81 which communicates with cavity 83 with which the driver housing 76 connects through orifice 84 which is completely blocked by the blowout liner 82.

A cover plate 85 is fastened in position by screws 86 closing fan chamber 87 within which fan blades 61 and and the pulleys 62 and 64 together with the timing belt 63 are positioned.

In the assembly the motor shaft drives pulley 62, timing belt 63 drives coupling shaft 68 through pulley 64, driver housing 76 and driver coupling magnet 77.

The speed of rotation of coupling shaft 68 is the densitometer design speed predetermined at several values to suit a series of density spans. Design speed decreases as the density level of the density spans increases. The fixed power available at coupling shaft 68 requires offsetting an increase in power requirement due to an increase in density with a decrease in power due to lower speed. A choice of speeds, each constant, is required at coupling shaft 68 while the speed available at motor shaft 38 is fixed by the frequency of power supplied to the synchronous motor. The necessary constant speed of coupling shaft 68 is obtained from the lower constant speed of motor shaft 38 by means of timing belt 63 and pulleys 62 and 64. Equally spaced teeth on the inner surface of timing belt 63 positively engage similarly spaced slots across the faces of pulleys 62 and 64.

Rotation of motor shaft 38 causes rotation of fan blades 61 drawing in air through filter member 80' in the direction of the arrows in FIG. 3. The air is drawn from the outside of the unit through the filter screen 80 through filter cavity 81 and filter member 80' and is pushed into the fan chamber 87. The air is pushed up through opening 60 in pulley housing cover 55 and up through the motor assembly and into annular space 88 within motor shroud 37.

The rotation of the fan blades 61 draws in air through the filter which is fed through the system as shown by the arrows in FIGS. 2 and 3, wiping and collecting the warm air and cooling the pulleys 62 and 64, timing belt 63, the journal and the whole system and is fed up through the motor housing and out opening 89. This is an important feature of the densitometer in that it keeps the heat generated by the driver from entering into or being fed into the sensor 24. This insures that the sample of gas being examined within sensor 24 remains at the temperature of the gas in pipe line 20 and is unaffected by the densitometer itself. In addition, the special isolation spacers 57 insulate the pulley assembly from the motor preventing conduction of the heat of the motor casing to the pulley casing. In other words, the isolation spacers keep the motor heat from going into the pulley assembly and the fan blades 61 take the heat from the pulley assembly and drive it up while collecting additional heat from the motor pushing the heated air out in the vicinity of the motor. In the preferred embodiment, isolation spacers 57 are of stainless steel selected to have a very low coefficient of heat transfer.

The driver housing section of the magnetic coupling is a sub-assembly in the form of a cartridge so that the item can be assembled, then put into the pulley housing and the housing is rabbeted to receive it for alignment. Also, if there is any damage or necessity for replacement, the entire unit can be removed and serviced in the field. The spring washer 72 is provided to preload the bearings on the driver housing 76 of the magnetic coupling so that it can operate at a specifically designated thrust.

Blowout liner 82 is a plastic lining on the filter housing casing and the liner abuts orifice 84 so that if there is an explosive force developed in the sensor 24 the buildup in pressure can escape into the surrounding atmosphere through a path including the driver cavity 83 in which driver housing 76 is disposed, filter cavity 81 and out into atmosphere. The plastic lining is designed so that with the buildup in pressure a force will prevail which will force the lining away from orifice 84. The operation resembles a flapper valve allowing the buildup in pressure to bleed out through orifice 84 and the space between the liner and shoulder 90 of the pulley housing 58 before the excessive pressures can cause damage.

Filter screen 80 is provided at the opening to the filter to prevent animals from entering when the motor is left out in the field in an installation, specifically, field mice. This shield is a circular grill member. Filter member 80' is a corrugated type filter which is quite common.

The sole function of fan blades 61 is to provide for the flow of air described above.

Cover plate 85 overlies an observation port which can be opened so that a person can look in and observe that the fan is running in the proper direction and that there is no interference to its operation, etc. There is no exchange of air through the opening covered by cover plate 85 and the cover plate may be sealed.

Sensor unit

The sensor unit 24 will now be described with reference to FIGS. 4, 5 and 10–19 wherein the unit is shown in detail. Reference is also made to pending application for United States Letters Patent entitled, "Centrifugal Gas Compressor," which bears Ser. No. 175,940, now Patent No. 3,171,353, the inventor of which is coinventor herein. The sole purpose of the driver described above is to drive the impeller 91 of the sensor unit at a predetermined constant speed.

Figure 4:
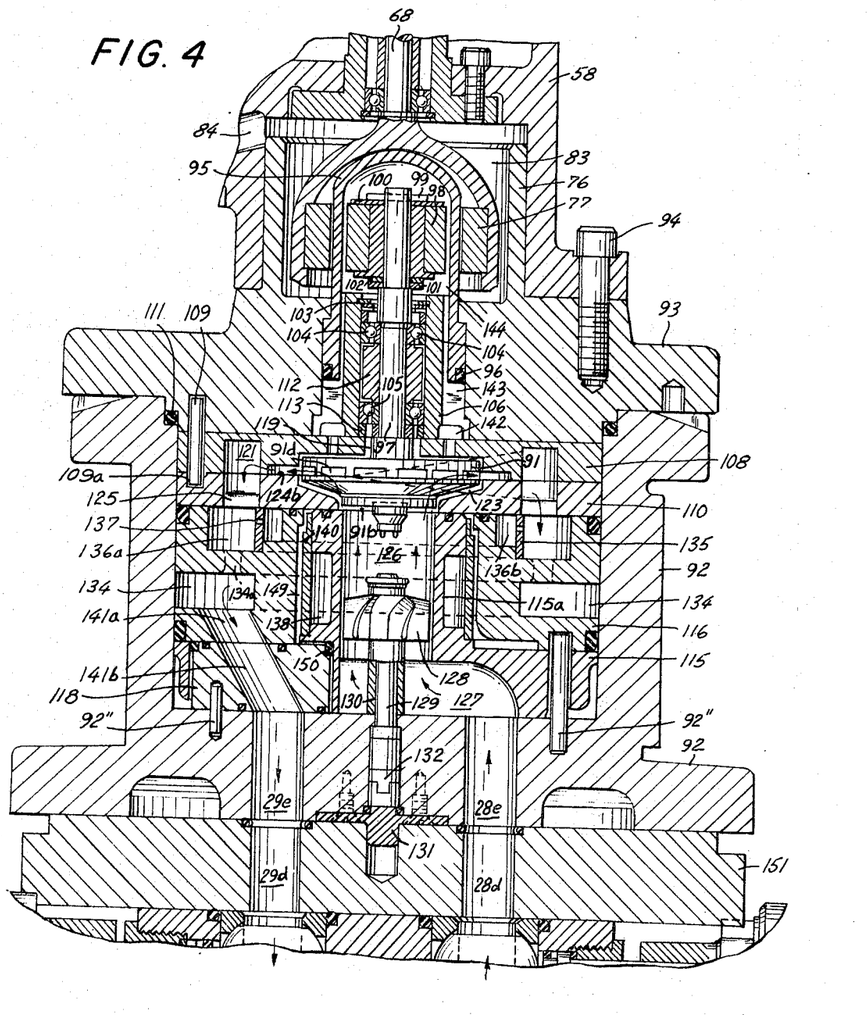
FIG. 4 is a vertical sectional view of the sensor utilized in the densitometer shown in FIG. 1 taken through the inlet and discharge ports.
Figure 5:
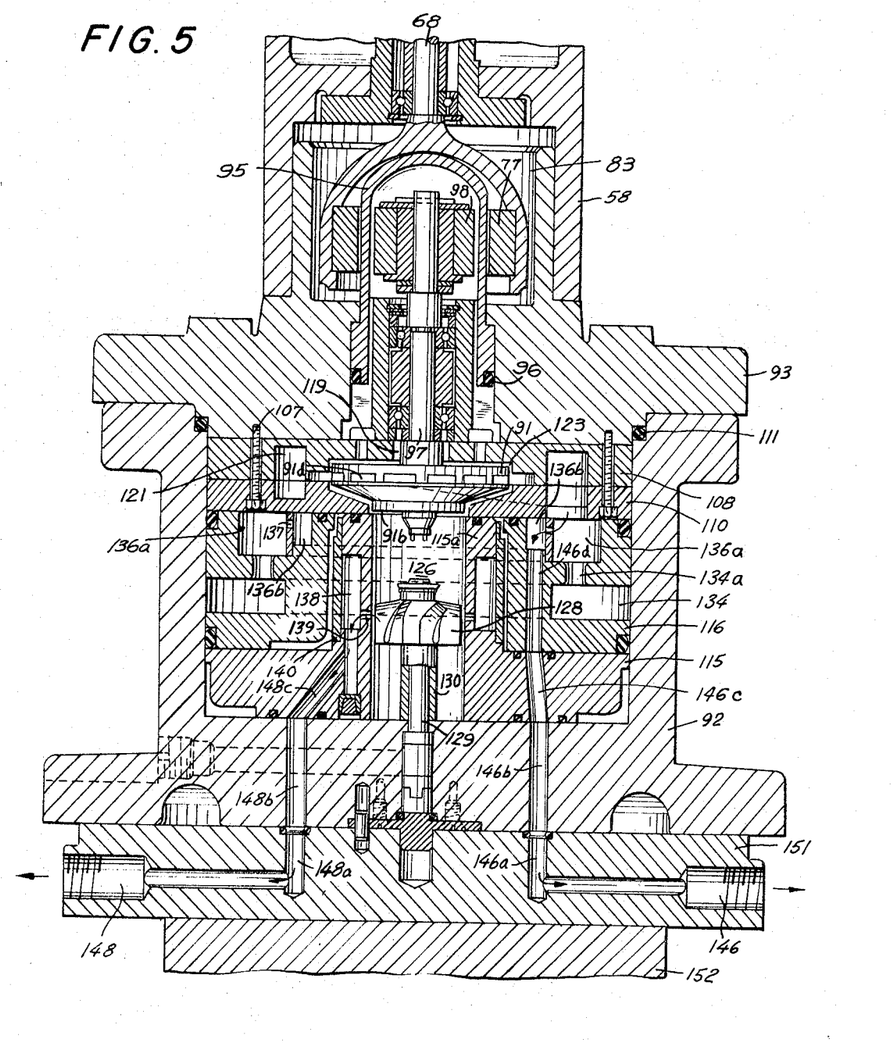
FIG. 5 is a vertical sectional view of the sensor shown in FIG. 4 taken through the high and low measurement ports.

The sensor housing is indicated by the numeral 92 and the sensor housing cover is indicated by the numeral 93. The pulley housing 58 is fastened to the sensor housing cover 93 by means of screws 94 with the driving part of the magnetic coupling within driver cavity 83. Seal cup 95 is between driver coupling magnet 77 and driven coupling magnet 98, enclosing the driven magnet and is fastened to sensor housing cover 93 with O-ring seals 96 provided to maintain a tight seal. Driven coupling magnet 98 is supported by impeller driving shaft 97. Magnet 98 is magnetized on its outer surface to give, with driver magnet 77 a one to one synchronous drive. Thus coupling shaft 68 transmits its rotational movement to impeller 91 by impeller driving shaft 97 which projects through opening 119 in sensor rear end plate 108 and thereby is driven at a predetermined speed.

Pin 99 and washer 100 are at the outer end of impeller driving shaft 97 while washer 101 and spring loading washer 102 are on the shaft at the other end of the driven coupling magnet 98. Washer 101 is utilized in assembly to maintain the positioning of the driven coupling magnet 98. Spring loading is provided by washer and shims 103.

Figure 10:
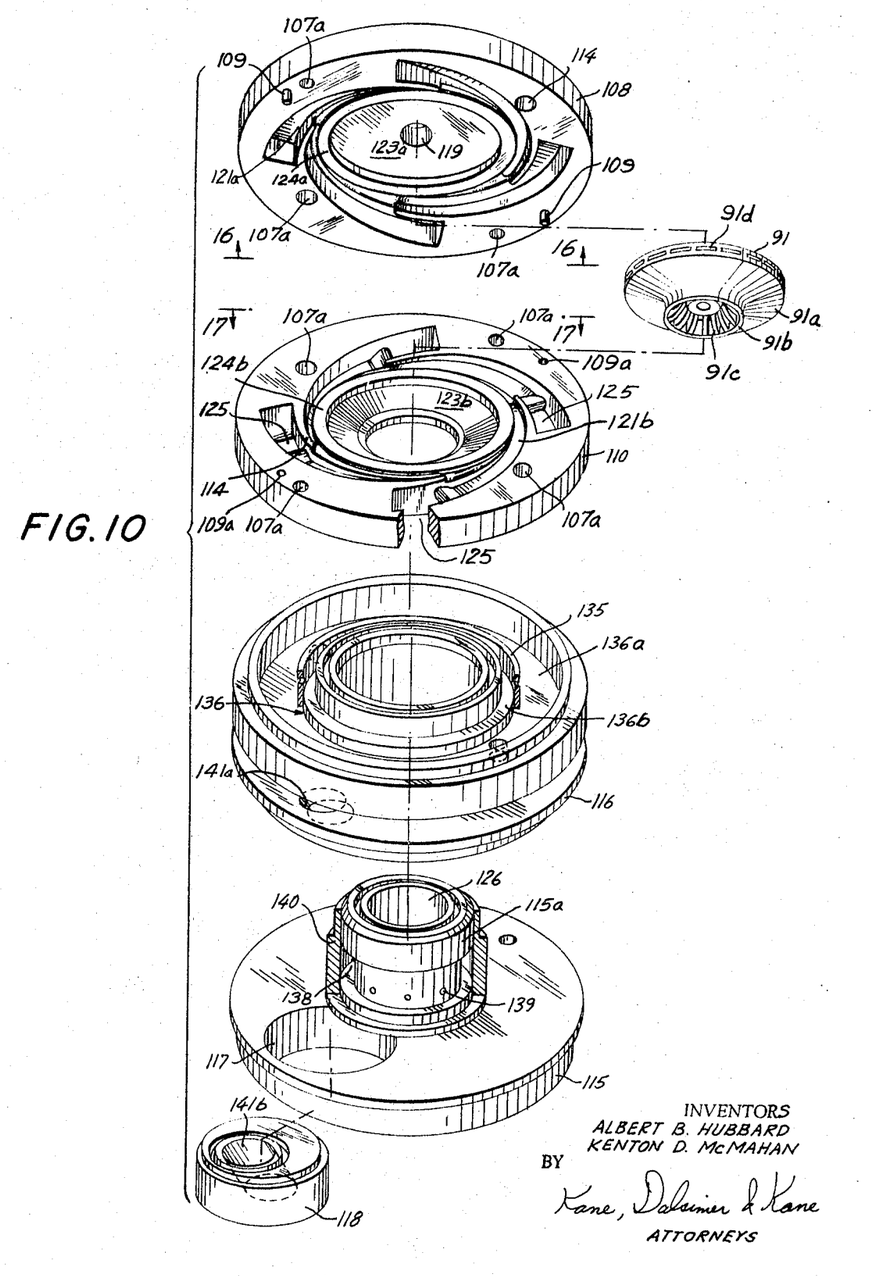
FIG. 10 is an exploded perspective view showing the internal part of the sensor.

Impeller driving shaft 97 is supported for rotation in ball bearings 104 and 105 by bearing sleeve 106 which is retained by rear end plate 108 of the sensor. A locating dowel pin 109 extends from sensor housing cover 93 through opening 109a in rear end plate 108 to front end plate 110. An O-ring seal 111 is provided between sensor housing cover 93 and sensor housing 92. The bearings 104 and 105 are separated by bearing spacer 112. Bearing 105 is positioned by bearing spacer 113 with respect to its outer race. The front end plate and the rear end plate 110 and 108, respectively, are bolted to one another and to sensor housing cover 93 by bolts 107. The openings through which the bolts and dowel pins extend are seen in FIG. 10 where the openings are indicated by the numeral 107a.

Impeller 91 is disposed within impeller cavity 123 formed by surfaces 123a and 123b of facing rear and front end plates 108 and 110 respectively. The impeller is a streamlined member having a shroud 91a, eye 91b and blades 91c set within eye 91b so gas flowing in the direction of the arrows shown in FIG. 4 can pass through impeller eye 91b, past the blades 91c and out the series of radial slots 91d formed in the shroud.

When the impeller 91 is rotated by the driver, gas, the density of which is to be measured, is taken into impeller eye 91b from the pipeline 20 via passage 28, 28a, 28b, 28c, 28d and 28e formed in pipe line 20, mounting ring 26, bottom disc 152, ball valve 170, top disc 151, sensor housing 92 respectively and inlet elbow 127 and inlet plenum 126 formed in intake manifold 115.

A reduced diameter portion of intake manifold cylindrical extension 115a provides an annular inlet piezo chamber 138 and radial holes 139 provide communication of inlet piezo chamber 138 with inlet plenum 126. The static pressure of the gas moving through inlet plenum 126 is built up in inlet piezo chamber 138 and measured at manometer connection 148 which is in communication with the inlet piezo chamber through passages 148a, 148b and 148c in disc 151, sensor housing 92 and intake manifold 115 respectively.

Figures 16, 17:
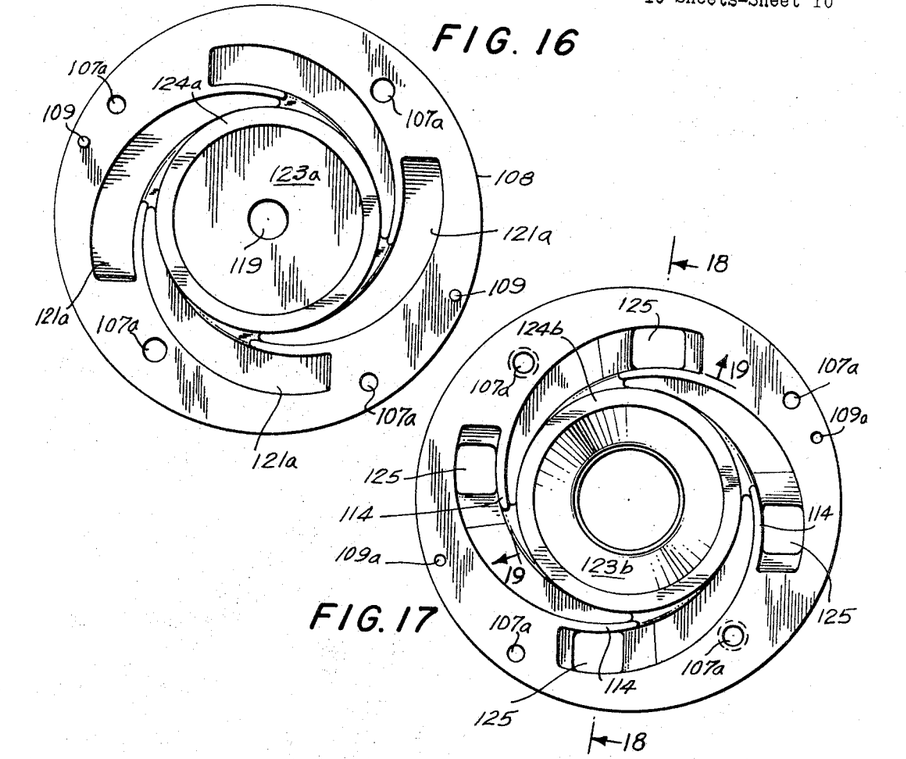
FIG. 16 is a face view of the rear end plate of the sensor showing portions of the involute discharge scrolls.
FIG. 17 is a face view of the front end plate of the sensor showing portions of the involute discharge scrolls and the overbend elbows.
Figure 18:
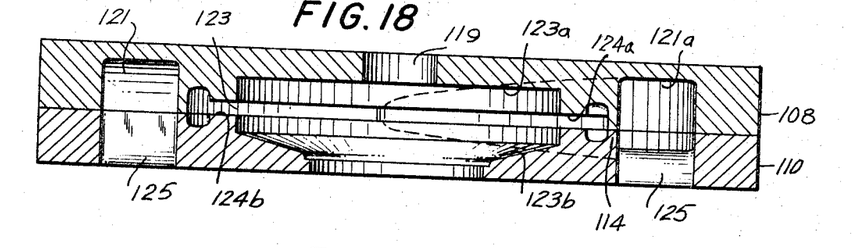
FIG. 18 is a sectional view of the front and rear end plates of the sensor joined and taken along a line 18—18 in the direction of the arrows in FIG. 17.

Around impeller 91 is a radial diffuser 124, formed by surfaces 124a and 124b, serving to convert velocity head to pressure head and around this diffuser are a plurality of similar perimetric involute discharge scrolls 121, four being shown equally spaced, for gathering the gas from the diffuser and forcing it therethrough by its rotation, for discharge through outlets 125. The discharge volutes are formed by grooves 121a and 121b in rear and front end plates 108 and 110 respectively and open into one another at diffuser 124 being bounded on one side by cutoffs 114.

The plates 108 and 110 are shown substantially circular and the discharge volutes 121 follow somewhat the circular contour of the plates and terminate in said outlets 125 which are equally spaced on a circumference. The said discharge volutes 121 have respective cross sectional areas expanding towards their respective outlets 125 and will serve thereby not only as discharge conduits but also as diffusers to convert the high velocity head into static pressure head.

Each outlet 125 of each discharge volute 121 is in the form of an overbend elbow so as to direct the gas from each volute 121 inwardly into discharge plenum 136a which is formed in discharge manifold 116 as a circumferential section of groove 136, discharge piezo chamber 136b being the remaining section of groove 136 and separated from discharge plenum 136a by piezo ring 135. Discharge plenum 136a and piezo chamber 136b are therefore concentric grooves separated by piezo ring 135 and communicating with one another through small piezo openings 137 in the piezo ring.

It has been determined that as a jet from a perimetric volute is turned radially through an elbow, the jet tends to crowd toward the outer bend of the elbow and away from the inner bend due to centrifugal action so that the resultant momentum of the jet, i.e., the jet velocity times its mass, is offset from the positional center line of the jet passage thereby causing the jet to have a rotational component as it enters the next stage.

Figure 19:
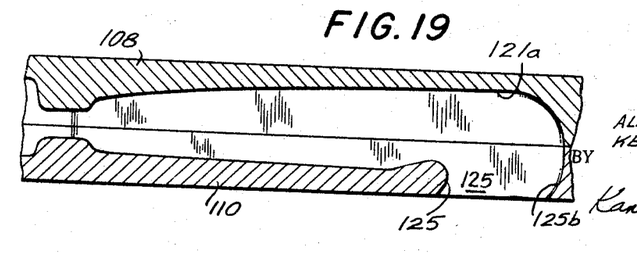
FIG. 19 is a sectional view of an overbend elbow of the sensor taken along a line 19—19 in the direction of the arrows in FIG. 17.

In the construction disclosed herein this adverse condition is substantially nullified by shaping the inner bend 125a of each outlet 125 so that it turns through an angle only sufficiently to direct the stream toward discharge plenum 136a but the outer bend 125b of the outlet has an overbend, i.e., turns through an angle greater than that sufficient to direct the stream inwardly. The effect of this overbend is to compensate for the tendency of the stream to crowd towards the outer bend and to cause thereby the resultant momentum of the jet entering discharge plenum 136a producing uniform axial jets free of rotational flow components.

The gas moves from discharge plenum 136a back to passage 29 in pipe line 20 through discharge collector 134 in communication with discharge plenum 136a through orifices 134a, passage 141a in discharge manifold 116, passage 141b in discharge connector 118 within opening 117 in intake manifold 115, and passages 29e, 29d, 29c, 29b and 29a in sensor housing 92, disc 151, ball valve 171, disc 152 and mounting ring 26.

Intake manifold 115, discharge manifold 116 and discharge connector 118 are aligned by dowels shown in FIG. 4 and indicated by the numeral 92″ and are held in position by the pressure of plates 110 and 108 affixed to sensor housing cover 93 in turn bolted to sensor housing 92.

The static pressure in discharge piezo chamber 136b is measured at manometer connection 146 which is in communication with the discharge piezo chamber through passages 146a, 146b, 146c and 146d in disc 151, sensor housing 92, intake manifold 115 and discharge manifold 116 respectively.

Figures 11, 11A, 12, 13, 14, 15:
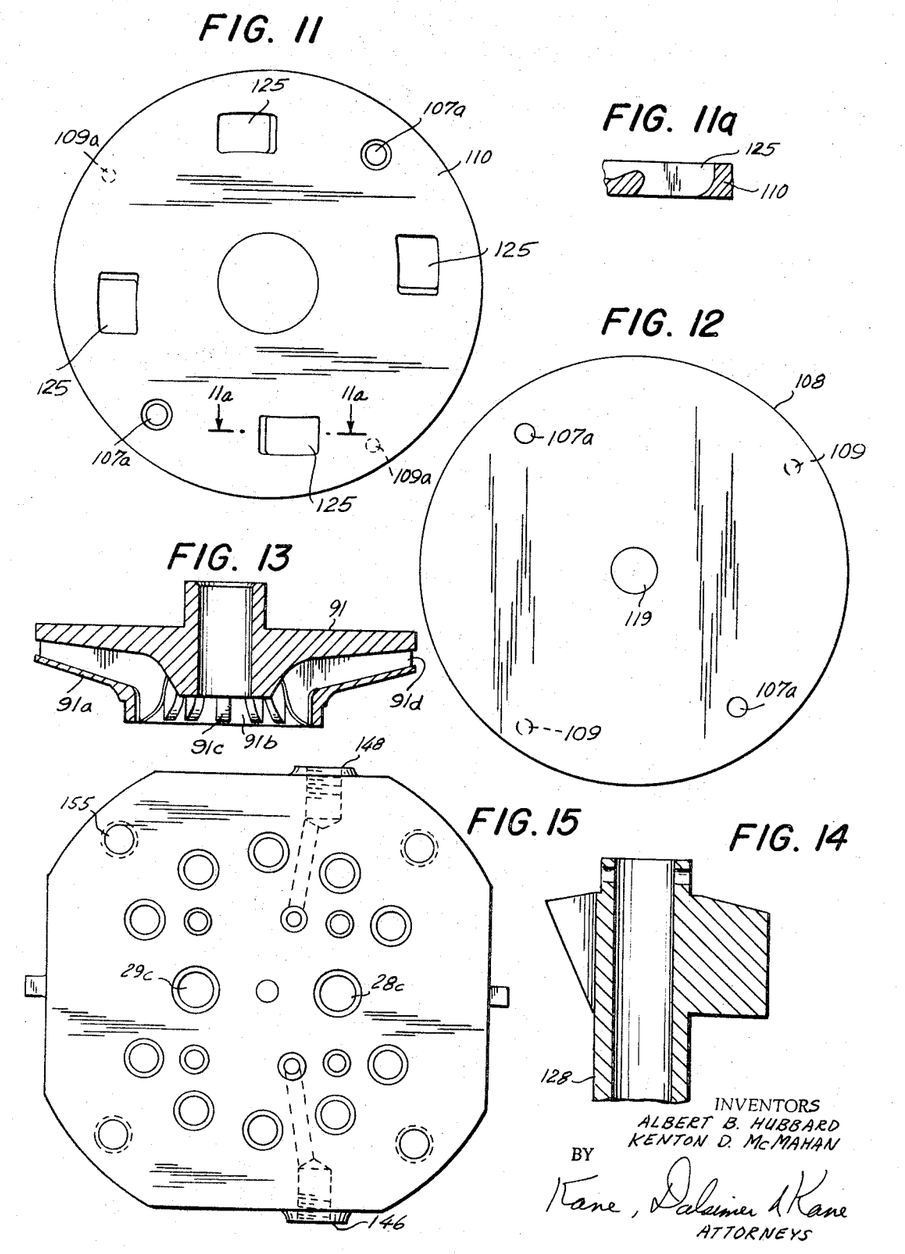
FIG. 11 is a bottom view of the front end plate shown in FIG. 10.
FIG. 11a is a sectional view taken along the line 11a—11a in the direction of the arrows in FIG. 11.
FIG. 12 is a top view of the rear end plate shown in FIG. 10.
FIG. 13 is a sectional view of the impeller shown in FIG. 10.
FIG. 14 is a segmentary sectional view of the swirler.
FIG. 15 is a plan view of the top disc of the service valve shown in FIG. 7.

Swirler blades 128 mounted in inlet plenum 126 on swirler shaft 129 located by spacer 130 is the calibrating device in the instrument. The gas passing the swirler is given a swirl in a direction which is opposite to the direction of rotation of impeller 91. This enhances the pressure rise characteristic of the blower system. The spacing and configuration of the swirler blades make it possible to vary the static pressure component sensed at piezo holes 139 sufficiently to achieve standard calibrations in spite of slight manufacturing variations.

The swirler has the same number of blades as there are piezo holes 139. In calibrating, the swirler is positioned to locate the blades with respect to the piezo holes 139 so that a certain effect is achieved. As the gas flows over the swirler blades an effect is produced similar to that experienced by the swing of an airplane in flight. Higher velocities over the convex surface of each blade causes lower static pressures or lift as it is termed in aeronautics. The static pressure near the wall of inlet plenum 126, and in the plane of piezo holes 139, is a minimum at the convex surface of a swirler blade. The static pressure gradually increases at a succession of angular positions in said plane until it reaches a maximum at the concave surface of the next blade. This pattern of static pressure variation is repeated between each pair of blades. The angular position of swirler 128 is adjustable. It is noted that a swirler position such that the convex blade surfaces are each closest to its associated piezo hole 139 results in the lowest static pressure at manometer connection 148 and hence the greatest difference in pressure between manometer connections 148 and 146, the pressure at the latter being unaffected by swirler position. Swirler position in which concave surfaces are close to piezo holes results in the highest static pressure at connection 148, hence least difference in pressure measured between connections 148 and 146. The two extremes of swirler position constitute the calibration range of the sensor without affecting the overall system in any way. In other words, the effect is on the reading alone.

The swirler is rotated until the desired output is obtained. Then it is locked in position by securing swirler shaft 129 by means not shown. It will be explained below how plug 131 is removed to gain access to shaft end 132 for purposes of calibration.

It is noted that in the sensor the seal cup 95 is formed in the shape of a dome so that there is an arcuate surface at the end which distributes the pressure in an even manner. The part is formed of strong non-magnetic material of high resistivity. The high resistivity reduces eddy current losses and the strong material permits the use of thin walls. Magnetic coupling was used because of the desire to have the sensor as a single sealed unit and a result direct coupling could not be used.

For operation in different density ranges, different speeds are desirable for impeller driving shaft 97. This is accomplished by changing to a different driver 21 having the necessary combination of belts and pulleys so that coupling shaft 68 runs at the desired speed. The sensor need not be disturbed or changed. It is necessary, however, to use a different calibration factor since each output speed of the driver has a different calibration factor associated therewith. A relief system or a pressure equalization system is provided by the doughnut shaped recess 142 in bearing sleeve 106 allowing communication with the holes in the back of rear end plate 108. Several slots 143 connect recess 142 to cavity 144. This prevents a pressure differential from occurring across the bearing and also prevents the bearings from being purged. In the event of a surge in the line the gas surge is transmitted to cavity 144. A sleeve 140 borders chamber 138 on the outside circumference thereof. The discharge connector 118 contains a central hole 141b.

It is further noted that a portion of the energy imparted to the gas stream by the impeller appears as heat. The gas leaving the outlets 125 flowing through discharge plenum 136a, through orifices 134a into discharge collector 134, thence through central hole 141b and finally back to the pipe line through passage 29 is warmer than the stream flowing to the impeller. Heat appearing within the blower and discharge passages has no direct effect on density measurement. However, transfer of such heat to the entering gas in inlet passage 28, inlet elbow 127 and inlet plenum 126 decreases density from its true value in the pipe line. The error tends to increase as density decreases over the design range and thus appears as undesirable non-linearity. To minimize internal heat transfer, discharge manifold 116 and discharge connector 118 are insulated with respect to intake manifold 115. Areas of mutual contact are reduced by relieving, or contact is prevented, for example, by interposition of insulating material, such as O-ring 150 shown in FIG. 4.

*Service valve*

Figure 6:
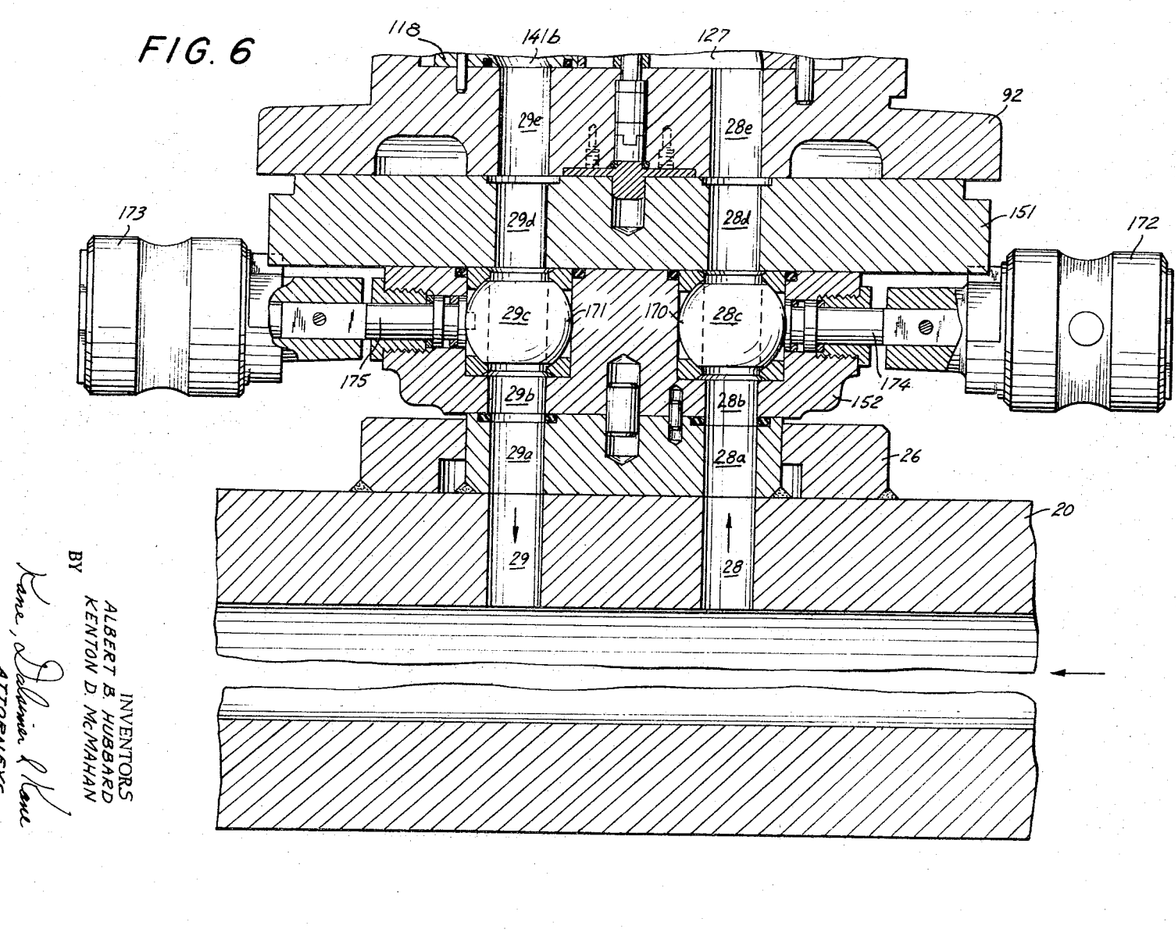
FIG. 6 is a vertical sectional view of the service valve utilized in the densitometer shown in FIG. 1 taken through the inlet and discharge ports.
Figures 7, 8, 9:
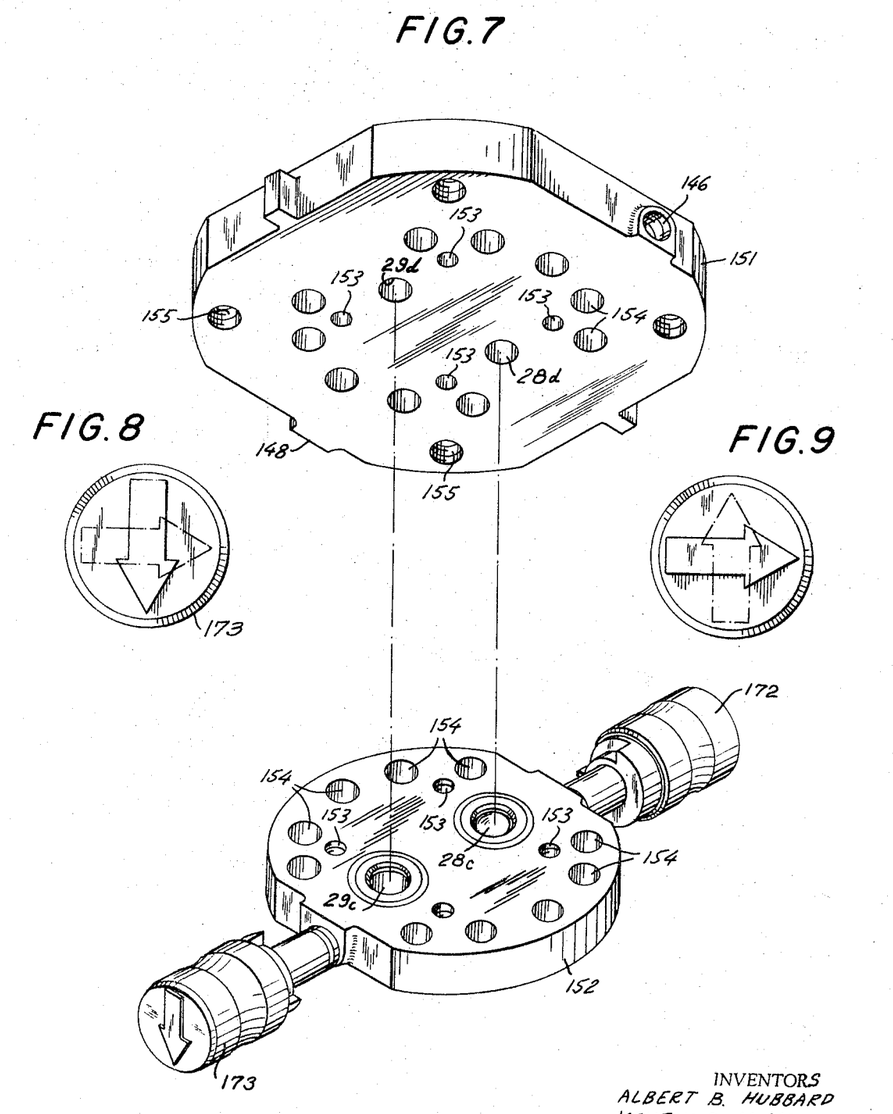
FIG. 7 is an exploded perspective view of the valve plates of the service valve shown in FIG. 6.
FIG. 8 is a face view of a knob of the service valve shown in FIG. 7 in full lines in ON position and in broken lines in OFF position.
FIG. 9 is a face view of the knob shown in FIG. 8 with the full lines indicating the OFF position and the broken lines indicating the ON position.

The service valve 25 is the remaining main unit of the densitometer and is shown in detail in FIGS. 6, 7 and 9.

The service valve consists of two main parts, top disc 151 and bottom disc 152. As seen in FIG. 7, openings 153 are for bolts connecting the discs 151 and 152. Openings 154 are provided in discs 151 and 152 for bolting the service valve to the mounting ring 26. Bolt openings 155 are provided in disc 151 for connecting the sensor to the service valve.

The service valve is provided with ball valves 170 and 171 as shown in FIG. 6 connected respectively to rotatable operators 172 and 173 which provide for rotation of the individual balls about an axis defined by shafts 174 and 175, respectively. Ball 170 is provided with a cylindrical passage 28c which, in one position of the ball, the valve open position, provides continuity between cylindrical passage 28d in disc 151 and 28b in disc 152. In like manner, passage 29c formed in ball valve 171 provides continuity between passage 29d in disc 151 and 29b in disc 152.

The service valve is affixed to mounting ring 26 by bolting through discs 151 and 152. Gas flow to the sensor 24 can be cut off by the ball valves to permit removal of the sensor.

*Calibration*

The instrument is designed so that it can be calibrated precisely through the use of laboratory equipment, or it can be routinely calibrated in the factory or field through use of a comparator whereby the instrument can be checked and if its calibration has changed, the operation can be modified so that the calibration factor is valid. The proportional relation of density $d$ and differential pressure output $h$ is $d$ equals $k$ times $h$ where $k$ is the densitometer calibration factor. The dimension of $k$ is pounds per cubic foot per inch of water differential.

Maximum density at which the instrument will operate is limited by the power available from the driver motor to avoid dropping below synchronous speed. Minimum density is a practical limitation to avoid excessive non-linearity where linearity is considered to be the constancy of the calibration factor over the rated density range.

The densitometer is calibrated at the factory by operation with gas at a known density and the calibration factor is that density divided by the corresponding differential pressure output. In this method the densitometer is piped in close coupling to a vessel of test gas where the volume of the vessel has been accurately determined. A quantity of gas precisely weighed is placed in the test vessel and from weight and volume density is calculated. The gas is introduced into the densitometer and differential pressure measured for the known density. The same procedure is followed with gases of other densities to verify linearity of the instrument over the range of density.

In the field a comparator is used for routine calibrations. The master densitometer or one which has been calibrated accurately recently in a lab is mounted adjacent the unit to be calibrated. The output lines of the two units are connected through three-way valves to the same electronic differential pressure transducer so that first one and then the other unit can be read. The output of the master unit is read first and balanced to the zero of a center reading meter. The subject unit or unit being calibrated is connected and its calibrator adjusted to the same zero. This is done at maximum sensitivity and repeated several times to make sure that densitometer outputs match.

The calibrator referred to above is the counter swirl device in the intake plenum referred to in the description as the swirler and indicated therein by the numeral 128. During calibration the instrument is removed from the line by separation of sensor housing 92 and top disc 151. Utilization of the service valve allows removal of the sensor and driver portions of the densitometer without disturbing the gauge line plumbing. Plug 131 is removed so access is obtained to swirler shaft 129. Driver 21 and sensor 24 are then bolted to the service valve of a weight-volume rig or comparator. Said service valve is fitted with a calibrating adaptor interposed between sensor housing 92 and disc 151. The central portion of the adaptor mechanism is a bushing which seals to sensor housing 92 in place of plug 131. The upper end of said plug is slotted to connect with the opposite feature at shaft end 132 of said swirler shaft 129. Furthermore, the bushing is the pivot point of a lever extending beyond the edges of disc 151 and arranged to impart 60° of rotation to the swirler which has six blades. Adjustment of the calibrating swirler over its 60° range can be accomplished while the unit is operating and under pressure.

As described above, the swirler has a plurality of blades, in the present application there are 6, which provide a swirl to the gas upon entering inlet plenum 126.

The gas passing through the swirler, as stated above, experiences a variation of static pressure from a minimum near the convex surface of each swirler blade and gradually increasing to a maximum near the concave surface of the next blade. Rotation of the swirler shifts the associated pattern of static pressure variation with respect to the piezo holes in the inlet plenum which sense only static pressure, said pressure being measured at manometer connection 148. Since the useful output of the sensor is the difference between the higher pressure at manometer connection 146 and the lower pressure at connection 148, said useful difference will vary from a maximum when the convex surface of each swirler blade is close to a piezo hole to a minimum when the swirler has been rotated through one blade pitch to bring the concave surface of each swirler blade close to a piezo hole. A capabilty of varying output about one and one-half percent over a 60° range of swirler rotation has been achieved. The swirler is securely locked into position before the unit is removed from test and plug 131 reapplied and the sensor housing 92 once again applied to disc 151.

Utilization of the service valve allows removal of the sensor and driver portions of the densitometer without disturbing the gauge line plumbing.

*Operation*

In operation the densitometer is placed in position on a semi-permanent basis and the service valves operated to provide continuity between inlet passage 28 and outlet passage 29 as shown in the figures. The densitometer circulates the gas sample from and back to pipe line 20 without the necessity of utilization of accessories or other equipment.

The driver unit is activated and motor shaft 38 of the synchronous motor drives coupling shaft 68 through timing belt 63. Fan blades 61 are rotated drawing cooling air from the atmosphere through filter member 80′ providing heat isolation. Impeller driving shaft 97 is rotated through the magnetic coupling rotating impeller 91 drawing gas from line 20 upwardly through inlet passage 28 in the main line 20, passage 28a in mounting ring 26, passage 28b in bottom disc 152, through passage 28c in ball valve 170, through passage 28d in top disc 151, and through passage 28e in sensor housing 92 into inlet elbow 127. The gas is then drawn into inlet plenum 126 past swirler 128. As the gas is drawn past the swirler the static pressure thereof appears at the piezo holes 139 which lie in a single plane perpendicular to the axis of swirler, impeller and inlet plenum 126 which are coincident, and which plane is intersected by the arcuate swirler blades and within annular inlet piezo chamber 138 which communicates with a manometer connection 148 through channel 148a in disc 151 and 148b in sensor housing 92. Hence the manometer through connection 148 measures, through a static pressure measurement, the pressure of the gas at the inlet of the densitometer prior to the gas passing the impeller 91.

The gas in inlet plenum 126 is drawn through the eye 91b in the impeller 91 past blades 91c thereof and out the radial slots 91d and into discharge involutes 121. The gas leaves the discharge involutes through outlets 125 with the overbend elbows and enters discharge plenum 136a and discharge piezo chamber 136b.

The gas enters discharge collector 134 through the connecting orifices 134a and enters passage 29e in housing 92 through connection passages 141a and 141b. Passage 29e is part of the discharge passage communicating with passages 29d, 29c, 29b, 29a and 29. Hence the gas has passed from passage 28 through the instrument to passage 29 and back into the main flow of the gas in pipe line 20.

As seen in the figures, outlets 125 are spaced equidistant from each other and two oppositely placed orifices 134a are provided to enhance the stability of the system and give symmetry of paths from discharge.

It was pointed out above that at manometer connection 148 a reading is available indicating the inlet pressure of the flowing gas. The discharge pressure of the flowing gas is measured at manometer connection 146 since discharge piezo chamber 136b contains a static pressure which is determined by the pressure of the gas after energy has been imparted thereto by the impeller. Discharge piezo chamber communicates with manometer connection 146 in plate 151.

It is seen, therefore, that the gas enters the unit at a single location, that being intake passage 28 and leaves the unit at a single location, that being discharge passage 29, while providing manometer connections 146 and 148 for reading of the pressure of the gas before and after it passes impeller 91. At the same time, the synchronous motor is driving a fan which is providing cooling air preventing the heat of the driver unit of the system from affecting the gas sample.

Since the instrument is mounted close coupled to the gas source, there is assurance that the density of the sample is the same as the density of the main gas stream. The densitometer provides direct measurement of the gas property which is most useful, not at reduced pressure or regulated flow as in other instruments, but at flowing conditions. Thus the unit eliminates the need for calculations in order to interpret a measurement. Provision is made for blowout and the magnetic coupling drive enables the motor shaft to remain wholly out of the sampling chamber. The densitometer can be used in connection with a variety of corrosive gases and the strong permanent magnet coupling eliminates friction and the possibility of leakage through a shaft seal.

It is a simple matter to change the density range of the densitometer in the field if changes in service conditions occur or if the unit is transferred to a different application. Range conditions can be met merely by replacing the driver unit with one which will result in an impeller rotational speed for the desired density span. Service valves are provided so that the unit can be removed from the pipe line without interfering with the coupling thereto. A different motor drive can be supplied for use in an alternate measurement.

Motor heat is isolated by sleeves which provide insulation and by the utilization of a cooling air flow and the intake and discharge manifold parts are separated. Additionally, the valve is separated from the rest of the densitometer bringing gauge connections to fixed points. The ball valves give wide open ports and enable cutoff and disconnect when desired. The separation of the driving unit allows adaptation to different density ranges.

It is further noted that the possibility of heat transfer affecting readings has been minimized by spacing the body of the motor from the housing thereby reducing heat conduction from the windings, cooling of the motor windings and a portion of the housing by utilization of the fan 61 and by designing the intake and discharge system in separate pieces.

It should be noted also that the shortest and most direct inlet and discharge paths have been provided with the input path centrally located and displaced from ambient and the housing.

Thus, among others, the several objects of the invention, as specifically aforenoted, are achieved. It will be apparent that numerous changes in construction and rearrangement of parts might be resorted to without departing from the spirit of the invention as defined by the claims.

We claim:
1. A densitometer for measuring the density of gas in an enclosure comprising in combination sensor and driver housings and a coupling means: said sensor housing including an impeller cavity, an impeller in said impeller cavity, an intake passage to said impeller cavity, a discharge passage from said impeller cavity, intake and discharge piezo chambers adjacent said intake and discharge passages respectively, first and second piezo openings communicating said intake and discharge passages with said intake and discharge piezo chambers respectively, manometer connections to said piezo chambers; said driver housing including an electrical motor for rotating said impeller at a predetermined speed; said coupling means providing a connecting intake and a connecting discharge passage between said enclosure and said intake and discharge passages respectively; an annular space surrounding said motor and fan blades forcing cooling air through said annular space, a pulley assembly interposed between said sensor and driver housings, said fan blades being supported within said pulley assembly, a passage between said pulley assembly and said driver housing, an opening formed in said driver housing exposing said annular space to atmosphere at a zone remote from said fan whereby cooling air is passed through said pulley assembly, said passage, said annular space and said opening.

2. A densitometer for measuring the density of gas in an enclosure comprising in combination sensor and driver housings and a pulley assembly between said sensor and driver housings, said driver housing including a motor and a motor shaft of said motor, said pulley assembly including a driver magnet of a magnetic coupling, a passage and a coupling between said motor shaft and said driver magnet; said sensor housing including an impeller cavity, an impeller rotatively supported in said impeller cavity, an intake passage to said impeller cavity, a discharge passage from said impeller cavity, intake and discharge piezo chambers adjacent said intake and discharge passages respectively, first and second piezo openings communicating said intake and discharge passages with said intake and discharge piezo chambers respectively, manometer connections to said intake and discharge chambers, a driven magnet within the magnetic field of said driver magnet, means coupling said driven magnet to said impeller for imparting rotatable motion to said impeller, a connecting intake and a connecting discharge passage between said enclosure and said intake and discharge passages respectively, fan blades within said pulley assembly, a second coupling between said fan blades and said motor shaft whereby cooling air is forced through said passage toward said motor by said fan blades when said motor shaft is rotated.

3. A densitometer in accordance with claim 1 in which the motor shaft of said motor extends through said passage and said fan blades are coupled to said motor shaft and driven thereby, a cavity in said pulley assembly exposing said fan blades to atmosphere and a filter element in said cavity.

4. A densitometer in accordance with claim 2 in which a filter cavity is provided within said pulley assembly exposing said fan blades to atmosphere and a filter member is provided in said filter cavity.

5. A densitometer in accordance with claim 4 in which a driver cavity is provided within said pulley assembly and said driver magnet is disposed within said driver cavity, an orifice in said pulley assembly connecting said filter and driver cavities and a blowout liner disposed in said filter cavity blockingly adjacent said orifice whereby expanding of air in said driver cavity will move said blowout liner from blocking adjacency with said orifice and allow the expanding air to bleed into atmosphere through said filter cavity.

6. In a densitometer for measuring the density of gas in an enclosure, an inlet plenum, an impeller cavity adjacent said inlet plenum, an impeller supported in said impeller cavity for rotation about an axis, an inlet elbow adjacent said inlet plenum in spaced relation with said impeller cavity, an annular inlet piezo chamber surrounding said inlet plenum, an annular discharge piezo chamber surrounding said inlet plenum, a discharge plenum, a series of involute discharge scrolls communicating with said impeller cavity, means communicating said discharge plenum with said discharge scrolls, first piezo holes between said inlet plenum and said inlet piezo chamber, second piezo holes between said discharge plenum and said discharge piezo chamber, direct inlet and discharge passages between said enclosure and said inlet elbow and said enclosure and said discharge plenum respectively, and first and second manometer connections to said first and second piezo chambers respectively.

7. A densitometer in accordance with claim 6 in which intake and discharge manifolds are provided, said intake manifold having formed therein said inlet elbow, said inlet plenum, and said inlet piezo chamber and said discharge manifold has formed therein said discharge plenum and said discharge piezo chamber.

8. A densitometer in accordance with claim 7 in which an opening is provided in said intake manifold in which a discharge connector having a portion of said discharge passage formed therein is disposed, said discharge connector being insulated from said intake manifold.

9. A densitometer in accordance with claim 6 in which valves are provided in said inlet and discharge passages and external means are provided for manually operating said valves.

10. In a densitometer for measuring the density of gas in an enclosure, an impeller cavity, an impeller supported in said impeller cavity for rotation about an axis, an eye of said impeller, means rotating said impeller about its axis at a predetermined constant speed, an inlet plenum communicating with the eye of said impeller, an inlet passage from said enclosure to said inlet plenum, a discharge plenum, a discharge passage from said discharge plenum to said enclosure, said impeller providing the sole means for drawing gas from said enclosure to said inlet plenum through said inlet passage and from said discharge plenum to said enclosure through said discharge passage, first and second means for measuring pressure of gas flowing in said inlet and discharge passages respectively, a plurality of involute discharge scrolls of gradually increasing rectangular cross section surrounding said impeller cavity with the apex of each of said scrolls communicating therewith, an outlet formed at the large end of each of said scrolls, and said outlets communicating with said discharge plenum.

11. A densitometer in accordance with claim 10 in which in addition to said eye said impeller includes a shroud, a plurality of radial slots formed in said shroud and radial blades within said shroud providing a plurality of passages between blades for flow of gas from said eye to said radial slots.

12. In a densitometer for measuring the density of gas in an enclosure an inlet plenum, an impeller cavity adjacent said inlet plenum, an impeller supported in said impeller cavity for rotation about an axis, means rotating said impeller at a constant speed, spaced inlet and discharge piezo chambers, a discharge plenum, discharge means communicating with said impeller chamber, means communicating said discharge means with said discharge plenum, an inlet piezo hole formed in said inlet plenum connecting said inlet plenum and said inlet piezo chamber, a discharge piezo hole connecting said discharge plenum and said discharge piezo chamber, an inlet passage from said enclosure to said inlet plenum, a discharge passage from said discharge plenum to said enclosure, first and second manometer connections to said inlet and discharge piezo chambers respectively, and a swirler within said inlet plenum having a plurality of stationary blades constructed and arranged to impart rotation to gas passing thereover.

13. A densitometer in accordance with claim 12 in which the axis of rotation of said impeller and the axis of said swirler are coincident.

14. A densitometer in accordance with claim 13 in which the rotation imparted to said gas by said swirler is in a direction opposite to the direction of rotation of said impeller.

15. A densitometer in accordance with claim 14 in which a plurality of inlet piezo holes are provided and said inlet piezo holes are formed in a plane perpendicular to the axis of said swirler and the blades of said swirler are arcuate and spaced from said inlet piezo holes and intersecting the plane thereof.

16. A densitometer in accordance with claim 15 in which said swirler is rotatable about its axis for positioning of the blades of said swirler relative to said inlet piezo holes for calibration.

17. A densitometer in accordance with claim 16 in which said inlet piezo holes are equidistant from one another and the number of said blades is equal to the number of said inlet piezo holes.

18. A densitometer in accordance with claim 10 in which a radial diffuser is provided between said impeller cavity and the apex of each of said scrolls serving to convert velocity head to pressure head.

19. A densitometer in accordance with claim 10 in which the outlets of said discharge scrolls are symmetrically spaced circumferentially about the axis of rotation of said impeller and direct the gas from each scroll into said discharge plenum.

20. A densitometer in accordance with claim 19 in which an annular discharge collector is provided between said discharge passage and said discharge plenum which are connected by equally spaced orifices directed parallel to the axis of rotation of said impeller providing a symmetrically balanced system.

21. A densitometer in accordance with claim 19 in which each of said outlets is provided with an inner bend turning through an angle sufficiently to direct the gas toward said discharge plenum and an outer bend turning through an angle greater than that sufficient to direct the gas toward said discharge plenum to thereby eliminate resultant gas momentum in a direction other than toward said discharge plenum.

22. In a densitometer for measuring the density of gas in an enclosure, an impeller, an intake manifold for said impeller, means for rotating said impeller about its axis at a predetermined constant speed, an intake passage from said enclosure to said intake manifold, a plurality of involute discharge scrolls of gradually increasing cross section surrounding said impeller with the apex of each of said scrolls open to said impeller, a collector system, an outlet formed at the large end of each of said scrolls communicating with said collector system, a discharge passage from said collector system to said enclosure and means for measuring the pressure differential between said intake and said discharge passages.

23. A densitometer for measuring the density of gas in an enclosure comprising in combination sensor and driver housings and a coupling means: said sensor housing including an impeller, an intake manifold for said impeller, an intake passage to said intake manifold, a discharge passage in communication with said impeller, and means for measuring the pressure differential between said intake passage and said discharge passage; said driver housing including driving means for rotating said impeller at a predetermined speed; said coupling means providing a connecting intake and a connecting discharge passage between said enclosure and said intake and discharge passages respectively; a shroud surrounding said driver housing and spaced therefrom, an isolation chamber provided by the spacing between said driver housing and said shroud and said isolation chamber being open to ambient, and means to cause a flow of air thru said chamber preventing heat developed in said driving means from being conducted to said sensor housing.

24. In a densitometer for measuring the density of gas in an enclosure, an impeller, an intake manifold for said impeller, means for rotating said impeller about its axis at a predetermined constant speed, an intake passage from said enclosure to said intake manifold, a collector system communicating with said impeller, a discharge passage from said collector system to said enclosure, means for measuring the pressure differential between said intake and said discharge passages, and a swirler within said intake manifold having a plurality of stationary concave-convex blades constructed and arranged to impart rotation to gas passing thereover and piezo means for measuring the variation of pressure between the convex surface of one blade of said swirler and the concave surface of the adjacent blade of said swirler at the outer periphery thereof.

25. A densitometer in accordance with claim 23 including a fan chamber open to ambient and to said isolation chamber, fan means within said fan chamber for drawing ambient air into said isolation chamber.

26. A densitometer in accordance with claim 25 in which said fan means are driven by said driving means.

27. A densitometer in accordance with claim 25 in which the driving means includes an electrical motor and said isolation chamber is an annular passage surrounding said motor and said fan means is constructed and arranged to force air into said chamber at the end of said passage other than that open to ambient.

References Cited
UNITED STATES PATENTS

| | | | |
|---|---|---|---|
| 2,306,742 | 12/1942 | Moody | 103—111 |
| 2,962,895 | 12/1960 | Rumble | 73—231 |
| 3,063,287 | 11/1962 | Hubbard | 73—30 |
| 3,080,495 | 5/1963 | Sudmeier | 230—15 |
| 3,172,364 | 5/1965 | Barotz | 103—87 |

JAMES J. GILL, *Acting Primary Examiner.*

R. C. QUEISSER, *Examiner.*

J. FISHER, D. SCHNEIDER, *Assistant Examiners.*